(12) United States Patent
Frangooles et al.

(10) Patent No.: US 12,114,183 B2
(45) Date of Patent: Oct. 8, 2024

(54) METHODS AND SYSTEMS FOR DETERMINING A WIRELESS SERVICE OUTAGE

(71) Applicant: T-Mobile USA, Inc., Bellevue, WA (US)

(72) Inventors: Robert Frangooles, Bellevue, WA (US); Christopher Chorney, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 125 days.

(21) Appl. No.: 17/532,489

(22) Filed: Nov. 22, 2021

(65) Prior Publication Data

US 2023/0164593 A1 May 25, 2023

(51) Int. Cl.
*H04W 24/04* (2009.01)
(52) U.S. Cl.
CPC .................................. *H04W 24/04* (2013.01)
(58) Field of Classification Search
CPC ..................................................... H04W 24/04
See application file for complete search history.

(56) References Cited

U.S. PATENT DOCUMENTS

| | | | | | |
|---|---|---|---|---|---|
| 7,158,790 | B1 * | 1/2007 | Elliott | ................... | H04W 16/00 455/457 |
| 8,923,134 | B2 * | 12/2014 | Meredith | .............. | H04W 16/18 370/252 |
| 9,585,036 | B1 * | 2/2017 | Tektumanidze | ...... | H04W 24/06 |
| 10,659,979 | B2 * | 5/2020 | Zou | ................... | H04W 52/0206 |
| 10,827,434 | B1 * | 11/2020 | Marupaduga | ......... | H04W 52/42 |
| 10,952,273 | B2 * | 3/2021 | Akoum | ................. | H04W 24/10 |
| 11,012,868 | B1 * | 5/2021 | Yang | ..................... | H04W 24/08 |

(Continued)

FOREIGN PATENT DOCUMENTS

| | | | | | |
|---|---|---|---|---|---|
| CA | | 2779430 A1 * | 7/2011 | ............... | G01S 5/02 |
| WO | WO-2014047352 A2 * | | 3/2014 | ............... | G01S 3/28 |
| WO | WO-2023014602 A1 * | | 2/2023 | | |

OTHER PUBLICATIONS

Rao, S. (2006). Operational fault detection in cellular wireless base-stations. IEEE Transactions on Network and Service Management, 3(2) doi:http://dx.doi.org/10.1109/TNSM.2006.4798311 (Year: 2006).*

(Continued)

*Primary Examiner* — Zhitong Chen
*Assistant Examiner* — Swati Jain
(74) *Attorney, Agent, or Firm* — Lee & Hayes, P.C.

(57) ABSTRACT

Methods and systems for determining an outage of the wireless communication services in an area are discussed herein. The area may indicate a geographic area defined by at least one of a city boundary, a census tract, a county boundary, or a state boundary. A method includes monitoring signals from a plurality of nodes that provide services to an area; determining, based at least in part on the signals, that at least one of the plurality of nodes is out of service; determining, based at least in part on census data of the area, a coverage level of the area, the coverage level indicating the coverage of services provided by the plurality of nodes in service; determining that the coverage level is less than a coverage threshold; and transmitting an outage notification to an emergency service provider.

20 Claims, 5 Drawing Sheets

(56) References Cited

U.S. PATENT DOCUMENTS

| | | | | |
|---|---|---|---|---|
| 11,363,466 B2* | 6/2022 | Khalid | | H04B 7/0608 |
| 2010/0103868 A1* | 4/2010 | Meng | | H04W 16/18 |
| | | | | 370/328 |
| 2011/0119375 A1* | 5/2011 | Beeco | | H04L 41/0677 |
| | | | | 709/224 |
| 2011/0130135 A1* | 6/2011 | Trigui | | H04W 24/08 |
| | | | | 455/423 |
| 2012/0008509 A1* | 1/2012 | Myers | | H04W 24/06 |
| | | | | 370/252 |
| 2012/0157089 A1* | 6/2012 | Yang | | H04W 24/08 |
| | | | | 455/424 |
| 2012/0236717 A1* | 9/2012 | Saska | | H04W 36/30 |
| | | | | 370/235 |
| 2012/0252467 A1* | 10/2012 | Chen | | H04W 16/18 |
| | | | | 455/446 |
| 2012/0322485 A1* | 12/2012 | Rosin | | H04W 24/04 |
| | | | | 455/509 |
| 2013/0051239 A1* | 2/2013 | Meredith | | H04W 16/18 |
| | | | | 370/241 |
| 2015/0201341 A1* | 7/2015 | Nunokawa | | H04W 24/04 |
| | | | | 455/67.13 |
| 2015/0365953 A1* | 12/2015 | Papadopoulos | | H04B 7/024 |
| | | | | 370/329 |
| 2016/0080248 A1* | 3/2016 | Rijnders | | H04L 45/22 |
| | | | | 709/224 |
| 2016/0088576 A9* | 3/2016 | Yavuz | | H04W 52/367 |
| | | | | 455/522 |
| 2017/0070900 A1* | 3/2017 | Chou | | H04W 24/02 |
| 2018/0007572 A1* | 1/2018 | Chou | | H04W 88/06 |
| 2019/0239086 A1* | 8/2019 | Shekalim | | H04W 24/02 |
| 2020/0162612 A1* | 5/2020 | Mullane | | G06Q 30/0281 |
| 2020/0275291 A1* | 8/2020 | Moisio | | G01S 19/46 |
| 2020/0413271 A1* | 12/2020 | Gupta | | H04W 36/0083 |
| 2021/0337393 A1* | 10/2021 | Wainer | | G06N 5/01 |
| 2021/0368355 A1* | 11/2021 | Liu | | H04W 16/18 |
| 2022/0264326 A1* | 8/2022 | Medithe | | H04W 16/28 |
| 2022/0368411 A1* | 11/2022 | Speidel | | H04B 7/18513 |
| 2023/0072676 A1* | 3/2023 | Gomes | | G06F 16/906 |
| 2023/0129078 A1* | 4/2023 | Wainer | | G06F 16/906 |
| | | | | 455/446 |
| 2023/0362654 A1* | 11/2023 | Zhang | | H04L 43/0829 |

OTHER PUBLICATIONS

Oikonomou, K. N., Sinha, R. K., Byoung-Jo Kim, & Doverspike, R. D. (2015). Performability analysis of a metropolitan area cellular network doi:http://dx.doi.org/10.1109/DRCN.2015.7149005 (Year: 2015).*

Boschiero, M., Giordani, M., Polese, M., & Zorzi, M. (2020). Coverage analysis of UAVs in millimeter wave networks: A stochastic geometry approach doi:http://dx.doi.org/10.1109/IWCMC48107.2020.9148550 (Year: 2020).*

Thurston, K. H., & Conte De Leon, D. (2019). MACH-2K architecture: Building mobile device trust and utility for emergency response networks doi:http://dx.doi.org/10.1109/MASSW.2019.00037 (Year: 2019).*

Ahmed, F., Erman, J., Ge, Z., Liu, A. X., Wang, J., & Yan, H. (2017). Monitoring quality-of-experience for operational cellular networks using machine-to-machine traffic doi:http://dx.doi.org/10.1109/INFOCOM.2017.8057165 (Year: 2017).*

* cited by examiner

METHODS AND SYSTEMS FOR DETERMINING A WIRELESS SERVICE OUTAGE

BACKGROUND

Current telecommunication systems include heterogeneous mixtures of various generations of wireless access technologies. Global Systems for Mobile (GSM) is an example of 2G telecommunications technologies; Universal Mobile Telecommunications System (UMTS) is an example of 3G telecommunications technologies; Long Term Evolution (LTE), including LTE Advanced, and Evolved High-Speed Packet Access (HSPA+) are examples of 4G telecommunications technologies. 5G cellular-wireless access technologies are recently implemented to provide improved bandwidth and faster response time to multiple network devices. The base stations of the wireless communication systems are deployed as access points to the user equipment (UE) in an area, but base stations fail in various circumstances.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Techniques for determining an outage of the wireless communication services in an area are discussed herein. In some examples, the area may indicate a geographic area defined by at least one of a city boundary, a census tract, a county boundary, or a state boundary. In implementations, the area may be a postal zip code area, or a zip code tabulation area (ZCTA) used by the United States Census Bureau. In other implementations, the area may be denoted by any illustrative numbers, letters, characters, or the combination thereof. Taken the ZCTA area as an example, the techniques may determine the service coverage in terms of the population of the area. Once the service coverage does not satisfy a preset condition, an outage notification is generated and reported to a third-party, for example, an Office of Emergency Services.

In some implementations, a method for determining an outage of the wireless communication services in an area may include monitoring the signals transmitted by a plurality of base stations that provide services to an area; determining that at least one of the plurality of nodes is out of service based on the signals; determining a coverage level of the area in terms of population of the area and/or the population percentage of the area; determining that the coverage level is less than a coverage threshold; and transmitting an outage notification to an emergency service provider.

In some implementations, the coverage level of the area is determined based on the coverage conditions of the census blocks nested therein. The method estimates the strength of the radio frequency (RF) signals received at the census blocks and determines whether the RF signal strength from at least one base station satisfies a threshold. If the RF signal strength from at least one base station satisfies a threshold, the census block is determined to be covered with services and the population of the census block is obtained to denote the coverage level of the census block. If the RF signal strength from all associated base stations does not satisfy the threshold, the census block is determined to be uncovered with services and zero is set to denote the coverage level of the census block.

In some implementations, the strength of the radio frequency (RF) signals are measured at a reference location of the census block. In some examples, the reference location may be set as a centroid of the census block.

In some implementations, when at least one base station is detected to be out of service, the coverage level of the census blocks associated with the base station are recomputed and the coverage level of the area that the census blocks belong to is also recomputed. Once the coverage level of the area does not satisfy a threshold for a certain period, a service outage is determined to have occurred and an outage report is generated.

In some implementations, the base stations may include eNodeB (eNB), gNBs or new radio (NR) base stations.

In some implementations, the techniques discussed herein may be implemented in the context of protocols associated with one or more of 3G, 4G, 4G LTE, and/or 5G protocols. In some examples, the network implementations may support standalone architectures, non-standalone architectures, dual connectivity, carrier aggregation, etc. Example implementations are provided below with reference to the following figures.

Figure 1:
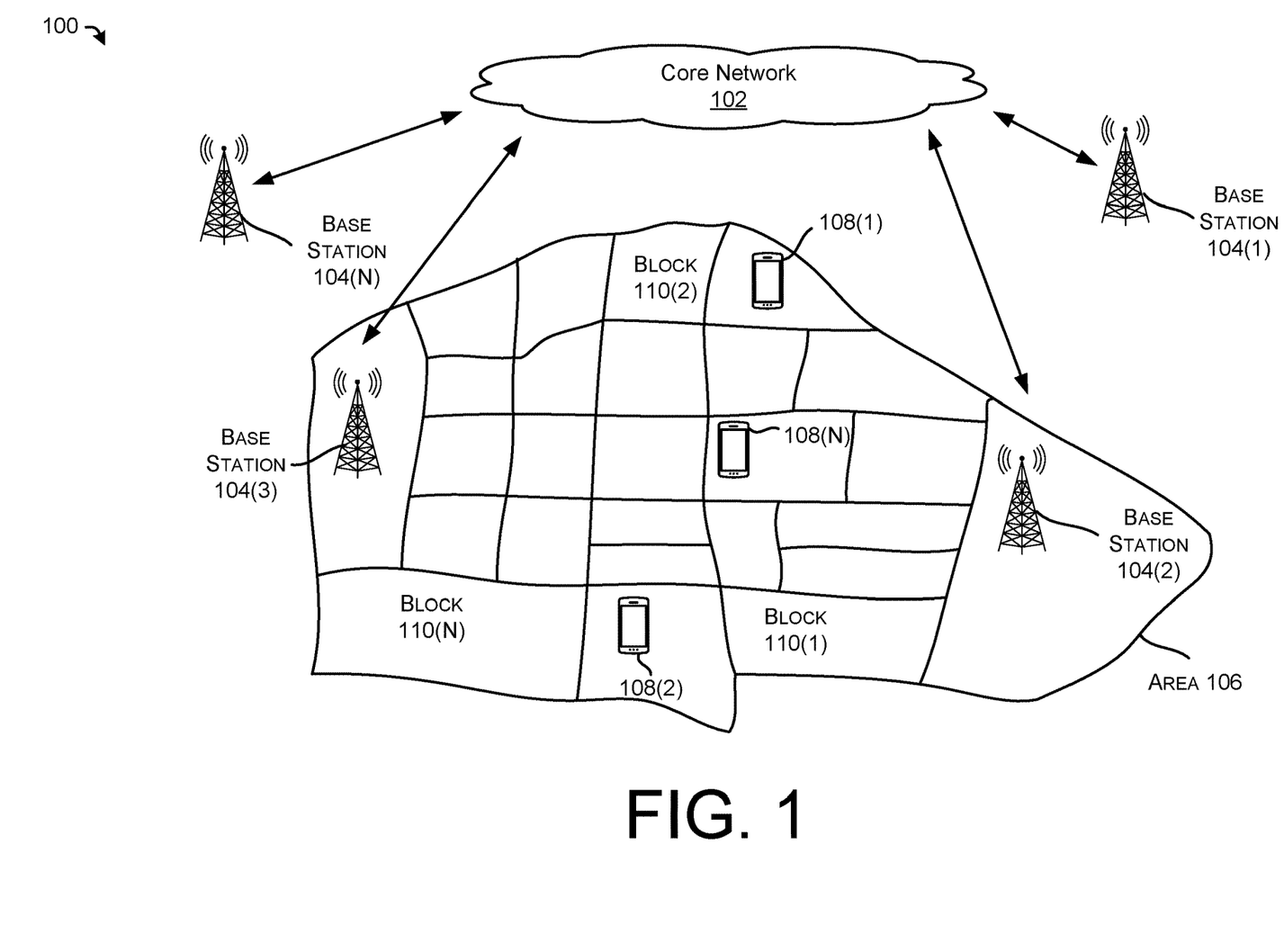
FIG. 1 shows an example network environment, in which one or more base stations are configured to provide wireless services to an area.

FIG. 1 shows an example network environment, in which one or more base stations are configured to provide wireless services to an area.

The network environment 100 may include a telecommunication network that comprises a core network 102 and one or more access points linked to the core network 102. The core network 102 and the access points may be compatible with one or more radio access technologies, wireless access technologies, protocols, and/or standards, such as 5G NR technology, LTE/LTE Advanced technology, other Fourth Generation (4G) technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMAX technology, Wi-Fi technology, and/or any other previous or future generation of radio access technology.

The access points may include one or more base stations 104(1), 104(2), 104(3), ..., 104(N) (where any unspecified base station may be referred to as a base station 104) that communicate with a plurality of user equipment (UE) 108(1), 108(2), ..., 108(N) (where any unspecified UE may be referred to as UE 108) and the core network 102, as well as other UEs and other base stations not illustrated in FIG. 1. In some examples, the base station 104 may be associated with an LTE access network known as an Evolved UMTS Terrestrial Radio Access Network (E-UTRAN). Base stations of the LTE access network can be known as eNBs. In some implementations, the base station 104 may be associated with a 5G access network with base stations known as gNBs or as new radio (NR) base stations. The base station 104 may connect to the core network 102 via various interfaces for transmission of user data and/or control data.

The UE 108 may be any device that can wirelessly connect to the telecommunication network. In some examples, the UE 108 may be a mobile phone, such as a smart phone or other cellular phone. In other examples, the UE 108 may be a personal digital assistant (PDA), a media player, a tablet computer, a gaming device, a smart watch, a hotspot, a personal computer (PC) such as a laptop, desktop, or workstation, or any other type of computing or communication device.

The UE 108 may wirelessly connect to one or more access points of the core network 102, for example, via the base station 104 or other access points. In some examples, the core network 102 can be a packet core network of an LTE network, which may be referred to as an Evolved Packet Core (EPC). In other examples, the core network 102 can be a 5G core network.

In the example environment illustrated in FIG. 1, the services to an area 106 is provided by one or more of the base stations 104(1), 104(2), 104(3), . . . , 104(N). The service may include voice service, short message service (SMS), multimedia messaging service (MMS), video, and 3G, 4G, 4G LTE, and/or 5G data services. The area 106 may be associated with a postal zip code used by the United States Postal Service. A postal zip code area may include a plurality of sub-areas or blocks bounded by the streets, highways, rivers, etc. In some examples, the area 106 may be a census area or a census tract. In other examples, the area 106 may include a geographic area defined by a city boundary, a county boundary, or a state boundary. The area 106 may be associated with a zip code tabulation area (ZCTA) code used by the United States Census Bureau. In other implementations, the area may be denoted by any illustrative numbers, letters, characters, or the combination thereof. The area 106 may include a plurality of blocks 110(1), 110(2), . . . , 110(N) (where any unspecified block may be referred to as block 110). The block 110 may be a census block according to the United States Census Bureau and may be bounded by streets, city/county/state boundaries, natural geographic features, etc. In cities, the census block may correspond to a city block. In the rural area where there are fewer roads, the census block may be delimited by other features such as political boundaries, rivers and creeks, etc. The population of the census block varies greatly. As of the 2010 census, there were 4,871,270 census blocks with a reported population of zero, while a census block that is entirely occupied by an apartment complex may have several hundred inhabitants.

Generally, the area 106 is covered by more than one base station to ensure reliable services. However, when one or more base stations encounter outage issues, the services provided to some sub-areas of the area 106 may be interrupted. In 2004, the FCC established outage reporting rules to address the critical need for rapid, complete, and accurate information on significant communications service disruptions that could affect homeland security, public health or safety, and the economic well-being of the nation. The California Office of Emergency Services (OES) also requires the service providers to report the outage that causes the loss of services in 50% or greater of the coverage that lasts for 30 minutes or longer. In existing operation, the service provider may rely on a backend software/application to monitor the status of the base stations. The software/application may estimate a radio frequency (RF) signal strength at various locations of the service area. Once the RF signal strength at a location is less a threshold, the service provided to that location is deemed to be lost. In some examples, when one base station is unavailable to provide service, an area covered by the base station may loss service coverage if not covered by other base stations. As the coverage areas of different base stations may overlap to some extent, it is less efficient to determine the coverage level of an area by simply estimating the RF signal strengths. The present disclosure proposes to incorporate the census data of an area to determine the coverage level of the services and can efficiently identify a coverage loss.

Figure 2:
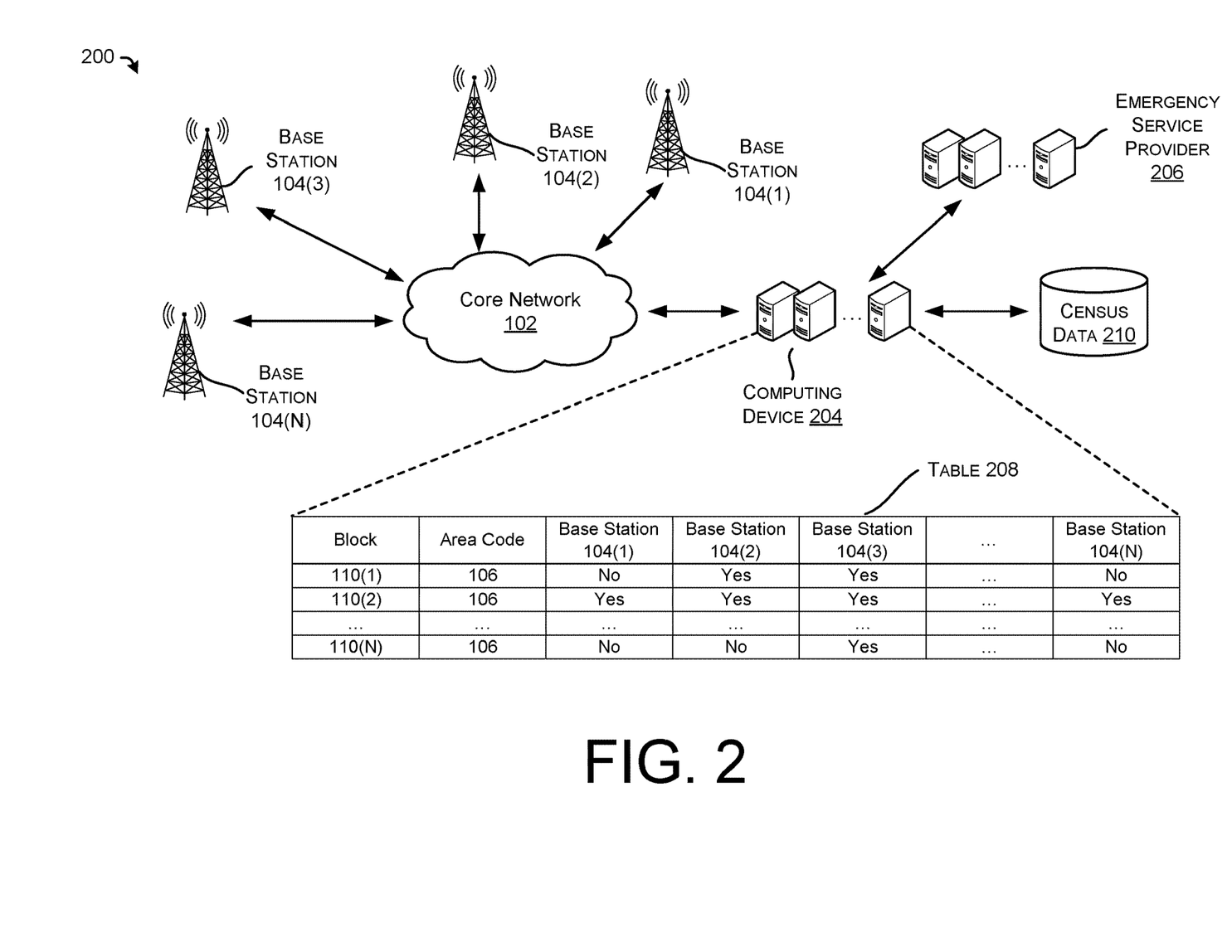
FIG. 2 shows another example network environment, in which a computing device determines a service outage based on the census data of the area.

FIG. 2 shows another example network environment, in which a computing device determines a service outage based on the census data of the area.

The network environment 200 may include similar elements of the network environment 100 in FIG. 1, i.e., the core network 102 and one or more base stations 104(1), 104(2), 104(3), . . . , 104(N). A computing device 204 may connect to the core network 102 and perform various actions related to the services. In some examples, the computing device 204 may deploy and maintain the network facilities, i.e., the backhaul capacity of the core network 102, the computing capacity of the base station 104, the storage capacity of the base station 104, etc. In other examples, the computing device 204 may monitor the performance of the network facilities, i.e., the backhaul capacity usage of the core network 102, the workload of the base station 104, the usage of the storage space of the base station 104, etc. In other examples, the computing device 204 may monitor the signal coverage of the base station 104 and determine whether an outage occurs in any of the service areas. The monitoring of the signal coverage may be automatically performed in a preset time period and/or performed in real-time.

Referring to the area 106 as illustrated in FIG. 1, the computing device 204 may generate a Table 208 to denote the information related to the base stations that provide services to the area and the coverage status of various blocks of the area. The information denoted in Table 208 may represent a real-time status of the service coverage. In some examples, the information denoted in Table 208 may represent a latest status of the service coverage. As shown in Table 208, blocks 110(1), 110(2), . . . , 110(N) and the respective area code (i.e., 106) associated therewith are recorded. In some examples, the area 106 may be a census tract or census area and the block 110 may be denoted as a four-digit census block number ranging from 0000 to 9999 nesting with the area 106. The table 208 may also include a list of base stations that serve the area 106 and indications as to whether the base stations cover one or more blocks of the area 106. As illustrated in Table 208, the block 110(1) is not covered by base station 104(1) and 104(N) and is covered by base station 104(2) and 104(3); the block 110(2) is covered by base stations 104(1), 104(2), 104(3), and 104(N); and the block 110(N) is only covered by base station 104(3) and not covered by base stations 104(1), 104(1), and 104(N).

It should be appreciated that the Table 208 is merely for the purpose of illustration. The present disclosure is not intended to be limiting. The Table 208 may include information related to the population of the area. The Table 208 may also include a priority order of the base stations that provide the service to a block. For example, the base station 104(2) may be set as the dominant base station for block 110(1) and the base station 104(3) may be set as the secondary base station for block 110(1). The computing device 204 may determine the priority order of the base stations based on the distances between the individual base stations to a block and/or the capacities of the individual base stations. In some examples, the priority order of the base stations may be dynamically configured based on the signal strength received at the individual bock in real-time. In some examples, the Table 208 may further include a service coverage of the individual block in addition to or alternative to the "Yes" and "No" indications. For example, the Table 208 may include a coverage ratio of the individual block where "0" indicates no coverage and "100%" indicates having coverage. In another example, the Table 208 may include a covered census population of the individual block where "0" indicates no coverage and a number of the census population of the individual block indicates having coverage.

The computing device 204 may obtain the census data from a third-party database, i.e., the United States Census Bureau. The computing device 204 may save a copy of the census data 210 in a local database and/or a remote storage space. The computing device 204 may determine whether the individual census blocks nested within an area are covered by at least one base station. In some examples, the coverage level of a census block is represented by the population of the census block. When an individual census block is not covered by any base stations, the computing device 204 may take zero population and set "0" as the coverage level. When an individual census block is covered by at least one base station, the computing device 204 may take the total population of the census block and set the total population as the coverage level of the census block. The computing device 204 may compute the coverage level of all the individual census blocks in the area and obtain the coverage level of the entire area based on the individual coverage levels. When one of the base stations is detected to be out of service, the computing device 204 may re-perform the process described above and re-compute the coverage level of the entire area. The computing device 204 may preset a coverage threshold. Once the coverage level of the entire area is less than the coverage threshold, the computing device 204 may send an outage report to an emergency service provider 206. The coverage threshold may be preset as a ratio of the total population of the area. In some examples, the ratio may be 50% of the total population of the area but it can also be set as other ratios. In some examples, the computing device may monitor whether the drop of the coverage level lasts for a certain period. By way of examples but without limitation, various thresholds can be used to evaluate the outage process. In some examples, when the drop of the coverage level to be less than the preset coverage threshold lasts for 30 minutes or longer, the computing device 204 may send an outage report to an emergency service provider 206.

The computing device 204 may be a single computing system or an edge host providing physical or virtual computing resources as known by persons skilled in the art. It should be appreciated that the computing device 204, as illustrated, is merely an example device and is not intended to suggest any limitation as to the scope of use or functionality of any computing device utilized to perform the processes described herein. Other well-known computing devices, systems, environments and/or configurations that may be suitable for use with the examples described herein include, but are not limited to, personal computers, server computers, hand-held or laptop devices, multiprocessor systems, microprocessor-based systems, network PCs, mainframe computers, distributed computing environments, etc.

Figure 3:
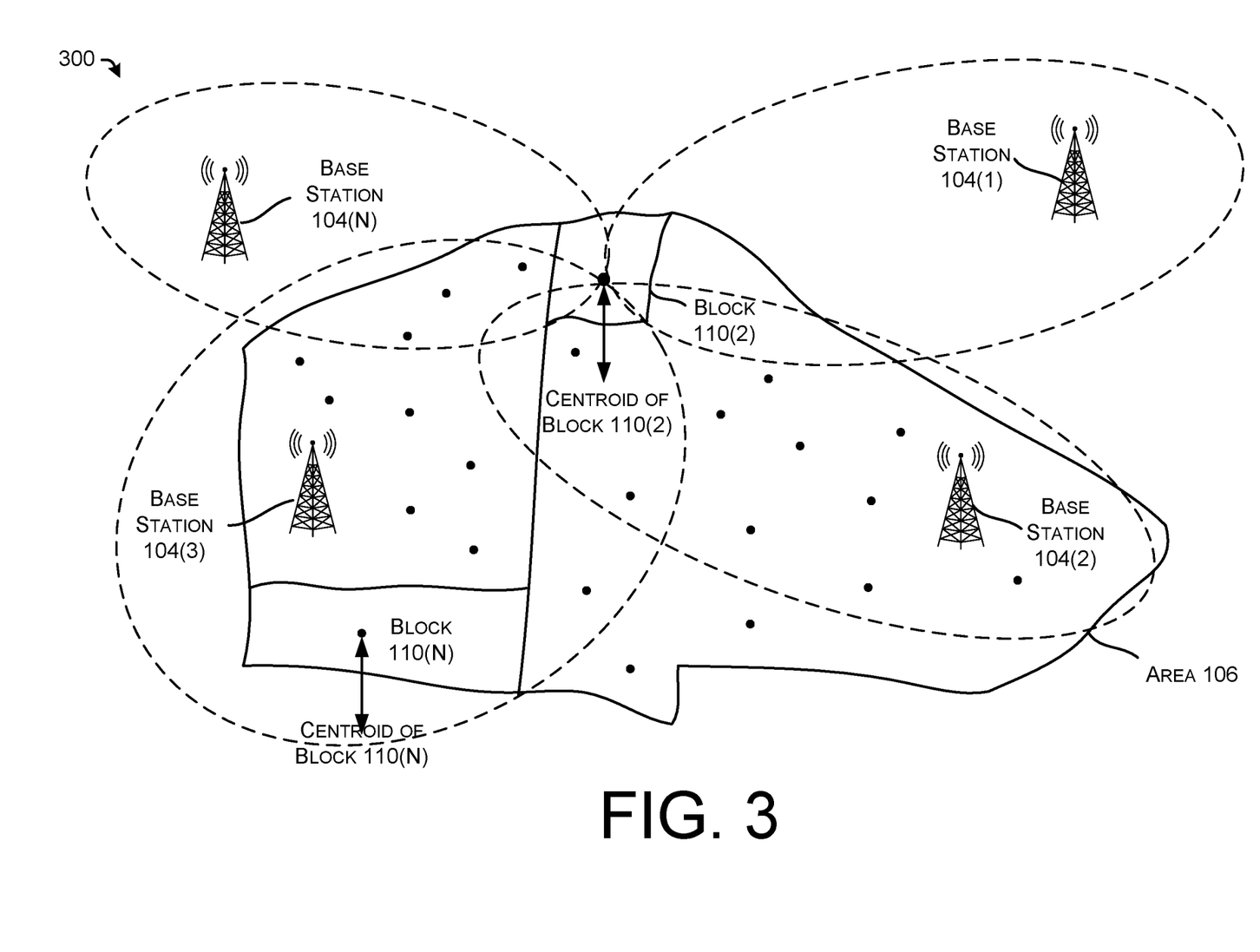
FIG. 3 shows another example network environment, in which a computing device determines a service outage based on the census data of the area.

FIG. 3 shows another example network environment, in which a computing device determines a service outage based on the census data of the area.

In the example environment 300, the block 110(2) of the area 106 can receive the signals transmitted by at least four base stations including base station 104(1), 104(2), 104(3), and 104(N). The signals, i.e., the RF signals, may be transmitted via individual radio channels associated with the individual base station. The signal strength of the radio channels may vary significantly due to various factors such as attenuation caused by intervening obstacles, interference from adjacent channels, fading and path loss resulting from the environments, etc. An individual base station may refer to its transmitter power output and the power loss in propagation to estimate the signal strength received at a location representing the block 110(2). The individual base station then reports the estimated signal strength received at the location to a server, for example, the computing device 204 in FIG. 2. In implementations, the 4G/4G LTE/5G network may use a received signal strength indicator (RSSI) to measure an average of the total received power. The total received power of the carrier RSSI may include the power from co-channel serving & non-serving base stations, adjacent channel interference, thermal noise, etc.

In implementations, the computing device 204 may preset an order of the base stations that serve an area based on the distances between the base station and a certain location representing the area and/or the terrain environment of the area. For example, in a downtown area, a base station located on a top of a hospital and close to the business blocks is more likely to be selected as the primary base station to serve the area. In some other implementations, the computing device 204 may further refer to the individual capacities of the base stations to preset the order of the base stations. For example, a base station that is configured with edge computing capacity and/or larger storage space may be preset as the dominant serving base station of the area. In some other implementations, the computing device 204 may preset the order of the base stations based on the estimated signal strength received at the location.

As discussed herein, the computing device 204 may receive the signal strength reports from the base stations in real-time and/or periodically. Based on the signal strength reports, the computing device 204 may determine whether one or more of the base stations that serve the area are out of service. By way of example and without limitations, the computing device 204 may use various thresholds (i.e., a preset dBm value) to determine whether a base station is out of service. In some circumstances, when the base station 104(3) is determined to be out of service, and the base stations 104(1), 104(2) and 104(N) operate normally, the coverage of block 110(2) is not affected. However, as the block 110(N) is only covered by the base station 104(3), the failure of the base station 104(3) causes the loss of the coverage of the block 110(N) entirely. When the census data is used to represent the coverage level, the coverage level of the block 110(N) then drops from the population of the block to zero. The computing device 204 may re-compute the coverage level of the entire area 106 in terms of population to determine whether an outage of services occurs.

As discussed herein, the census data of a census block may be provided in the form of boundaries (i.e., polygons) or centroids (i.e., points). A centroid is a point located in the geographic center of the polygon. The centroid represents and contains the same attributes of the census block in polygon. By way of examples and without limitations, the present disclosure uses the census block centroid of the individual census block as a reference location to measure the signal strength received thereon, thus, determining whether a base station is operating normally to cover the census block. When the signal strength received at the census block centroid is less than a preset threshold, the computing device 204 determines that the census block is not covered by the corresponding base station. By utilizing the census data of a geographic area and measuring the signal strength received at the individual census block centroid to monitor the network operations, the present disclosure provides an efficient solution to detect and report a service outage.

It should be appreciated that the shapes that denote the base station coverage are merely for illustration purposes. The present disclosure is not intended to be limiting. As multiple antenna designs may be implemented, such as directional antenna, antenna array, beamforming, phased array beamforming, etc., the base station coverage may be illustrated in any other manners.

Figure 4:
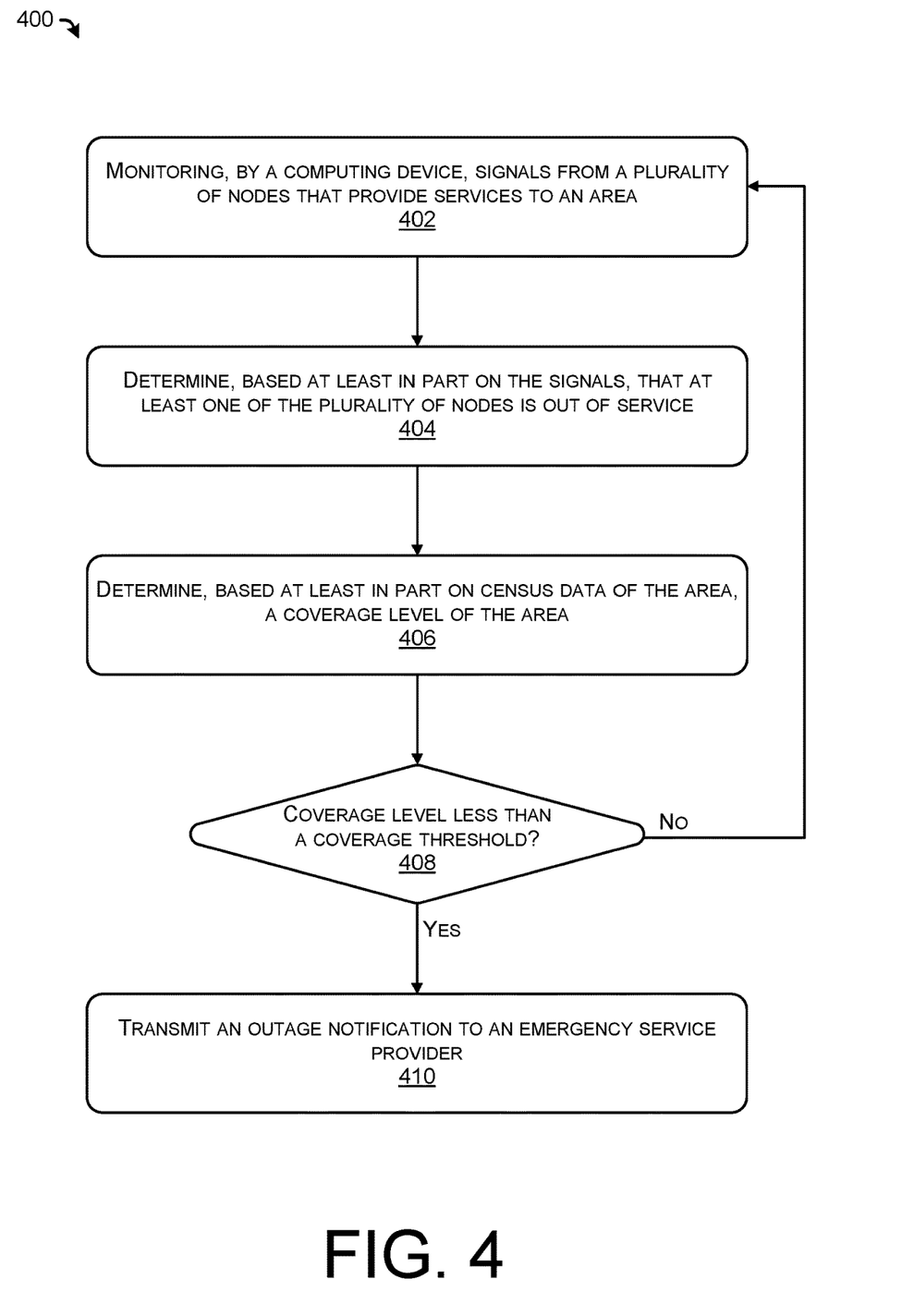
FIG. 4 illustrates an example process for determining a service outage based on the census data of the area.

FIG. 4 illustrates an example process for determining a service outage based on the census data of the area. The example process 400 may be performed by the computing device 204, as illustrated in FIG. 2.

At operation 402, the computing device may monitor the signals from a plurality of nodes that provide services to an area. The plurality of nodes may include various types of access points of a service provider. In implementations, the service provider may include wireless communication operators that provide voice services, SMS services, MMS services, 2G/3G/4G/4G LTE/5G data services. The access points may include base stations configured to support various services. For example, the base station of the 5G network is configured to work in conjunction with 4G network requirements. The base station of the 5G network may be further configured to support mobile edge computing. In some examples, a reference location within the area is selected to detect the signals from the base stations. The base station measures the strength of the RF signals received at the reference location in real-time or periodically. The base station considers various factors that affect the RF signal strength, for example, attenuations due to obstacles on the propagation path, interference from neighboring antennas and/or transmission channels, etc.

As discussed herein, an area is generally a polygon. For a geographic area, the polygon is mostly in an irregular shape. In some examples, a gravity center of the polygon may be set as the reference location of the area. In some other examples, a population center of the polygon may be set as the reference location of the area. The reference location may be referred to as a centroid or a center point denoted by a latitude value and a longitude value. In some instances, the reference location may be denoted by a latitude value, a longitude value and an altitude value. There are multiple ways to define the centroid, leading to different geographic locations. A mean center is the point on which a rigid, weightless map would balance perfectly, if the population members are represented as points of equal mass. A median center is the intersection of two perpendicular lines, each of which divides the population into two equal halves. A geometric median is the point to which the population has the smallest possible sum of distances, or equivalently, the smallest average distance. In implementations, the decisions are also made on the granularity of the population data, depending on the population density patterns. The computing device 204 may obtain the data related to the centroid of the census blocks nested within the area from the United States Census Bureau. The data related to the centroids of the census blocks nested within the area may be transmitted to and saved at individual base stations via the network. With the centroids data (i.e., the latitude, longitude, and/or altitude data), the base station can compute a distance from the base station to the individual centroid of the census block and measure the strength of the RF signals received at the centroid of the census block. The base stations may periodically transmit the measured RF signal strength values to the computing device 204.

At operation 404, the computing device may determine, based at least in part on the signals, that at least one of the plurality of nodes is out of service. In implementations, the computing device may compare the measured RF signal strength at the centroid with a preset threshold. If an RF signal strength measured by a base station is less than the preset threshold, the computing device determines that the census block represented by the centroid is not receiving service from the base station. For example, an optimal RSSI in a 4G network on each end of a wireless connection is between −48 dBm and −65 dBm so as to achieve the highest possible data rates. If the RF signal strength is less than −75 dBm, typically for very long distance over 4 miles, it may be difficult to sustain a link reliably or to achieve high throughputs. The computing device 204 may preset −70 dBm as the threshold and the RF signal strength being below that threshold will indicate a coverage loss of the corresponding census block by the base station.

At operation 406, the computing device may determine, based at least in part on census data of the area, a coverage level of the area. In some examples, the area may be associated with a postal zip code. In other examples, the area may be associated with a ZCTA code used by the United States Census Bureau. In other implementations, the area may indicate a geographic area defined by at least one of a city boundary, a county boundary, or a state boundary. The area may be denoted by any illustrative numbers, letters, characters, or the combination thereof. Given the ZCTA code as an example, the area may comprise a plurality of census blocks, the smallest geographic unit used by the United States Census Bureau for tabulation of 100-percent data. The area is normally covered by a plurality of base stations and an individual census block is covered by at least one base station from one or more wireless communication carriers. The computing device may obtain the census data from the database of the United States Census Bureau. In implementations, the computing device may save a copy of the census data in its local database and/or a remote storage space, i.e., a database that connects to a server device, or a cloud storage space.

As discussed herein, the computing device may maintain a mapping table between individual census block and one or more base stations that are configured to serve the individual census block. The mapping table may include other information from the census data of the area, i.e., the ZCTA code that the individual census block belongs to, the population of the individual census block, etc. the When a census block can receive, from at least one base station, an RF signal equal to or greater than a signal strength threshold, the census block is deemed to be covered with the services. In general, an individual census block is covered by at least one base station. The coverage level of the census block may be denoted by the population of the census block and the coverage of the area may be determined based on the population of the area that are covered with the services. In some examples, the coverage level of the area may be denoted as a percentage of population in the area that can receive the services.

When one or more of the plurality of base stations are detected to be out of service, the computing device may identify one or more census blocks that are affected by the one or more out-of-service base stations based on the mapping table (i.e., the Table 208 as illustrated in FIG. 2). The computing device may further check whether the individual census block of the one or more census blocks is covered by at least another base station that is operating in normal status. If the individual census block is covered by at least another base station that is operating in normal status, the computing device determines that the individual census block is still covered with services. If the individual census block is not covered by any other base stations, the computing device determines that the individual census block loses service coverage and updates the coverage level of the individual census block from the population of the individual census block to "0." The computing device may obtain the area code, i.e., the ZCTA code, that associates with the individual census block from the mapping table and update the coverage level of the area based on the coverage level change of the individual census block.

At operation 408, the computing device may determine whether the coverage level is less than coverage threshold. According to the government regulations, a wireless communication carrier is required to provide a reliable service to the public, which includes ensuring a certain percentage of base stations operating in normal status, providing services that cover at least a certain percentage of the area, etc. Hence, the computing device may preset a coverage threshold according to the government regulations. As discussed herein, the coverage threshold may be set to ensure 50% or greater of the total population of the area can receive the service normally. If the coverage level is less than the coverage threshold, at operation 410, the computing device may transmit an outage notification to an emergency service provider (i.e., the emergency service provider 206 as illustrated in FIG. 2). If the coverage level is not less than the coverage threshold, the computing device may continue monitoring the signals from the plurality of nodes that provide services the area, as described in operation 402.

In implementations, the computing device may determine whether the drop of the coverage level of the area lasts for a certain period. If the drop of the coverage level lasts for the certain period or longer, at operation 410, the computing device may transmit an outage notification to an emergency service provider (i.e., the emergency service provider 206 as illustrated in FIG. 2). If one or more base stations are back on service within the certain period causing the coverage level of the area to be increased to satisfy the coverage threshold, the computing device does not send the outage report to the emergency service provider.

It should be understood that the outage process is handled according to the requirements of different administrative units. By way of examples but without limitation, various thresholds can be used to evaluate the outage process including different coverage level of the area, the certain period that the drop of coverage level lasts, etc. Types of the thresholds to evaluate the outage process may vary according to the requirements and/or regulations of the different administrative units. In some examples, any threshold may be dynamically set according to the census data distribution and/or the network operating conditions. In an area with a high-density population, the coverage threshold may be configured to be greater than 50%. Additionally, or alternatively, the outage period threshold may be set as shorter in the area of high-density population.

Figure 5:
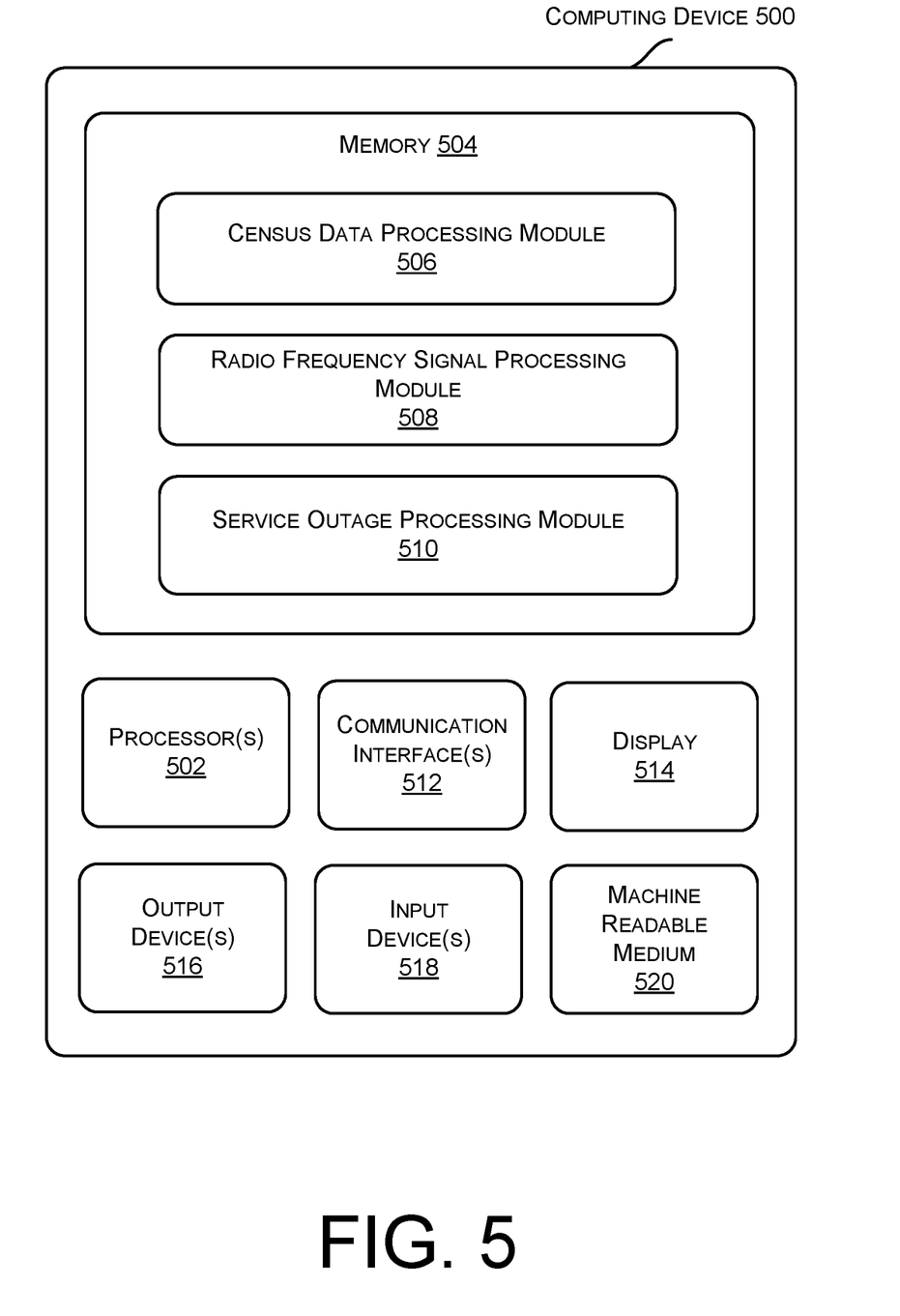
FIG. 5 illustrates a block diagram of a computing device implementing the process described above.

FIG. 5 illustrates a block diagram of a computing device implementing the process described above. As shown, a computing device 500 may comprise process(s) 502, memory 504 that stores a census data processing module 506, a radio frequency signal processing module 508, and a service outage processing module 510, communication interface(s) 512, a display 514, output device(s) 516, input device(s) 518, and a machine readable medium 520.

The processor(s) 502 may be a central processing unit (CPU), a graphics processing unit (GPU), or both CPU and GPU, or any other type of processing unit. Each of the one or more processor(s) 502 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 502 may also be responsible for executing all computer applications stored in the memory 504, which can be associated with common types of volatile (RAM) and/or nonvolatile (ROM) memory.

The memory 504 may include system memory, which may be volatile (such as RAM), non-volatile (such as ROM, flash memory, etc.) or some combination of the two. The memory 504 may further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information.

The census data processing module 506 may be configured to retrieve the census data from the databases associated with the United States Census Bureau and save a copy of the census data in a local and/or a remote storage space including but not limited to, the memory 504, the machine readable medium 520, local databases, and/or a cloud database, etc. The census data processing module 506 may incorporate at least part of the census data to monitor the operation of the network. For example, the census block data may be used to determine the RF signal coverage of the area. The operations that the census data processing module 506 performs are described above in connection with FIGS. 2-4.

The radio frequency signal processing module 508 may be configured to measure the RF signal strength received at the individual census block. The radio frequency signal processing module 508 may measure the RF signal strength at a reference location of the individual census block, for example, the centroid of the individual census block. The radio frequency signal processing module 508 may further compare the measured RF signal strength with a threshold to determine whether a base station is operating normally. The operations that the radio frequency signal processing module 508 performs are described above in connection with FIGS. 2-4.

The service outage processing module 510 may be configured to determine whether the coverage level of an area satisfies a coverage threshold. Based on the RF signal strength measured at the reference location of an individual census block, the service outage processing module 510 may determines whether the individual census block is covered with services provided by at least one base station. When one or more census blocks are detected not covered with services, the service outage processing module 510 re-compute the coverage of the area, to which the one or more census blocks belong. If the coverage of the area (i.e., in terms of population of the area) does not satisfy a threshold for a certain period, the service outage processing module 510 determines a service outage occurs in the area and notifies a third-party to act. The operations that the service outage processing module 510 performs are described above in connection with FIGS. 2-4.

The communication interface(s) 512 may include transceivers, modems, interfaces, antennas, and/or other components that perform or assist in exchanging radio frequency (RF) communications with UE(s) of the telecommunication network, other Wi-Fi access point, and/or otherwise implement connections with one or more networks. For example, the communication interfaces 512 may be compatible with multiple radio access technologies, such as 5G radio access technologies and 4G/LTE radio access technologies. The communication interfaces 512 may be configured to allow the computing device 500 to exchange data with various resources including but not limited to, base stations, UE(s), thirty-party databases (i.e., the census data stored in the database of the United States Census Bureau), etc.

The display 514 may be a liquid crystal display or any other type of display commonly used in any computing devices. For example, display 514 may be a touch-sensitive display screen, and can then also act as an input device or keypad, such as for providing a soft-key keyboard, navigation buttons, or any other type of input. The output device(s) 516 may include any sort of output devices known in the art, such as the display 514, speakers, a vibrating mechanism, and/or a tactile feedback mechanism. The output device(s) 516 may also include ports for one or more peripheral devices, such as headphones, peripheral speakers, and/or a peripheral display. The input device(s) 518 may include any sort of input devices known in the art. For example, the input device(s) 518 may include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 520 may store one or more sets of instructions, such as software or firmware, that embodies any one or more of the methodologies or functions described herein. The instructions may also reside, completely or at least partially, within the memory 504, the processor(s) 502, and/or the communication interface(s) 512 during execution thereof by the computing device 500. The memory 504 and the processor(s) 502 may can constitute machine readable media 520.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method of dynamic monitoring of coverage level in an area comprising:
   monitoring signals from a plurality of nodes that provide services to the area, wherein at least some of the plurality of nodes are associated with a first organization;
   determining, based at least in part on the signals, that at least one of the plurality of nodes is out of service;
   determining an explicit coverage level, based at least in part on:
      census data of the area from multiple sub-areas of the area,
      those nodes of the plurality of nodes currently in service in the area, and
      an indication of a population provided with corresponding services, wherein the indication is derived by adding population data from the multiple sub-areas of the area;

determining that the explicit coverage level in the area is less than a required coverage threshold; and communicating an outage notification to an emergency service provider, wherein the emergency service provider is a regulatory body mandating the outage notification or a second organization.

2. The method of claim 1, wherein the sub-areas are a plurality of blocks, and the method further comprises:
determining, based at least in part on individual census data of each block of the plurality of blocks, an individual coverage level of each block; and
determining, based at least in part on the individual coverage level of each block, the explicit coverage level of the area.

3. The method of claim 2, further comprising:
determining, based on a sum of the individual coverage levels of the plurality of blocks, the explicit coverage level of the area; and
setting the coverage threshold as fifty percent of the explicit coverage level of the area.

4. The method of claim 2, further comprising:
obtaining individual census data of an individual block;
determining that the individual block is covered by at least one of the plurality of nodes; and
setting the individual census data of the individual block as the individual coverage level of the individual block.

5. The method of claim 4, further comprising:
determining that the individual block is not covered by at least one of the plurality of nodes; and
setting zero as the individual coverage level of the individual block.

6. The method of claim 3, further comprising:
determining a signal strength at a centroid of an individual block;
determining that the signal strength is equal to or greater than a signal threshold; and
determining that the individual block is covered by at least one of the plurality of nodes.

7. The method of claim 1, wherein the area indicates a geographic area defined by at least one of a city boundary, a census tract, a county boundary, or a state boundary.

8. The method of claim 1, wherein the plurality of nodes is configured with radio transceivers and the signals include radio frequency (RF) signals.

9. A system for dynamic monitoring of coverage level in an area comprising:
a processor, and
a memory storing instructions executed by the processor to perform operations including:
monitoring signals from a plurality of nodes that provide services to the area, wherein at least some of the plurality of nodes are associated with a first organization;
determining, based at least in part on the signals, that at least one of the plurality of nodes is out of service;
determining an explicit coverage level, based at least in part on:
census data of the area from multiple sub-areas of the area,
those nodes of the plurality of nodes currently in service in the area, and
an indication of a population provided with corresponding services, wherein the indication is derived by adding population data from the multiple sub-areas of the area;
determining that the explicit coverage level in the area is less than a required coverage threshold; and
communicating an outage notification to an emergency service provider, wherein the emergency service provider is a regulatory body mandating the outage notification or a second organization.

10. The system of claim 9, wherein the sub-areas are a plurality of blocks, and the operations further comprise:
determining, based at least in part on individual census data of each block of the plurality of blocks, an individual coverage level of each block; and
determining, based at least in part on the individual coverage level of each block, the explicit coverage level of the area.

11. The system of claim 10, further comprising:
determining, based on a sum of the individual coverage levels of the plurality of blocks, the explicit coverage level of the area; and
setting the coverage threshold as fifty percent of the explicit coverage level of the area.

12. The system of claim 10, further comprising:
obtaining individual census data of an individual block;
determining that the individual block is covered by at least one of the plurality of nodes; and
setting the individual census data of the individual block as the individual coverage level of the individual block.

13. The system of claim 12, further comprising:
determining that the individual block is not covered by at least one of the plurality of nodes; and
setting zero as the individual coverage level of the individual block.

14. The system of claim 10, further comprising:
determining a signal strength at a centroid of an individual block;
determining that the signal strength is equal to or greater than a signal threshold; and
determining that the individual block is covered by at least one of the plurality of nodes.

15. The system of claim 9, wherein the area indicates a geographic area defined by at least one of a city boundary, a census tract, a county boundary, or a state boundary.

16. The system of claim 9, wherein the plurality of nodes is configured with radio transceivers and the signals include radio frequency (RF) signals.

17. A non-transitory computer-readable storage medium storing computer-readable instructions for dynamic monitoring of coverage level in an area, that when executed by a processor, cause the processor to perform actions comprising:
monitoring signals from a plurality of nodes that provide services to the area, wherein at least some of the plurality nodes are associated with a first organization;
determining, based at least in part on the signals, that at least one of the plurality of nodes is out of service;
determining an explicit coverage level, based at least in part on:
census data of the area from multiple sub-areas of the area,
those nodes of the plurality of nodes currently in service in the area, and
an indication of a population provided with corresponding services, wherein the indication is derived by adding population data from the multiple sub-areas of the area;
determining that the explicit coverage level in the area is less than a required coverage threshold; and
communicating an outage notification to an emergency service provider, wherein the emergency service provider is a regulatory body mandating the outage notification or a second organization.

18. The non-transitory computer-readable storage medium of claim 17, wherein the sub-areas are a plurality of blocks, and the actions further comprise:
   determining, based at least in part on individual census data of each block of the plurality of blocks, an individual coverage level of each block; and
   determining, based at least in part on the individual coverage level of each block, the explicit coverage level of the area.

19. The non-transitory computer-readable storage medium of claim 17, wherein the actions further comprise:
   obtaining individual census data of an individual block;
   determining whether the individual block is covered by at least one of the plurality of nodes;
   in response to the determining that the individual block is covered by at least one of the plurality of nodes, setting the census data of the individual block as the individual coverage level of the individual block; and
   in response to the determining that the individual block is not covered by at least one of the plurality of nodes, setting zero as the individual coverage level of the individual block.

20. The non-transitory computer-readable storage medium of claim 18, wherein the actions further comprise:
   determining a signal strength at a centroid of an individual block;
   determining that the signal strength is equal to or greater than a signal threshold; and
   determining that the individual block is covered by at least one of the plurality of nodes.

* * * * *